United States Patent

[11] 3,558,030

[72] Inventors Herbert W. Hempel
Belleville;
Forrest G. Hill, East St. Louis, Ill.
[21] Appl. No. 754,600
[22] Filed Aug. 22, 1968
[45] Patented Jan. 26, 1971
[73] Assignee Marsh Stencil Machine Company
Belleville, Ill.
a corporation of Illinois

[54] CONTROL MECHANISM FOR ELECTRICAL TAPE-DISPENSING MACHINE

12 Claims, 12 Drawing Figs.

[52] U.S. Cl. .......... 226/135, 33/132
[51] Int. Cl. .......... B65h 17/22
[50] Field of Search .......... 235/103; 226/135, 109, 110, 156, 9; 33/129, 132, 132.5, 136

[56] References Cited

UNITED STATES PATENTS

| | | | |
|---|---|---|---|
| 2,797,919 | 7/1957 | Hempel | 226/135UX |
| 3,148,814 | 9/1964 | Studer | 226/9 |
| 3,229,880 | 1/1966 | Arp | 226/109 |
| 3,284,907 | 11/1966 | Frost | 33/136 |
| 3,300,113 | 1/1967 | Lane | 226/110 |

*Primary Examiner*—Richard A. Schacher
*Attorney*—Kingsland, Rogers, Ezell, Eilers & Robbins ABSTRACT: A novel tape-length selector or control mechanism for electrical tape-dispensing machines comprising a head cover casting supporting on the top a plurality of tape-length selector pushbuttons disposed in a circle, a novel 16-pole switch supported beneath said casting for selective actuation by said pushbuttons, a diode logic board or diode selective switching board disposed beneath and secured to the casting supporting the said switch in cooperative relation for selective energization thereby, a computer board assembly supported beneath the diode logic board including a binary multistage counter which is conditioned for counting by said diode logic board upon selective energization thereof, a normally open reed-type pulse switch electrically connected with the counter, a measuring wheel rotatably engaged by fed tape, a permanent magnet mounted for rotation by the measuring wheel adapted to close the pulse switch twice per revolution of the measuring wheel, a transformer for supplying low voltage to a rectifier for direct current to the counter and diode logic board, an on-off and random operation switch, and integrating circuitry.

PATENTED JAN 26 1971

3,558,030

INVENTORS:
HERBERT W. HEMPEL
FORREST G. HILL

BY Kingsland, Rogers, Ezell, Eilers & Robbins
ATTORNEYS

INVENTORS:
HERBERT W. HEMPEL
FORREST G. HILL
BY Kingsland, Rogers, Ezell, Eilers & Robbins
ATTORNEYS INVENTORS:
HERBERT W. HEMPEL
FORREST G. HILL
BY Kingsland, Rogers, Ezell, Eilers & Robbins
ATTORNEYS INVENTORS:
HERBERT W. HEMPEL
FORREST G. HILL
BY Kingsland, Rogers, Ezell, Eilers & Robbins
ATTORNEYS

CONTROL MECHANISM FOR ELECTRICAL TAPE-DISPENSING MACHINE

BACKGROUND OF THE INVENTION

1. Field of the Invention

The present invention relates generally to electrically energized machines for dispensing gummed tape used for commercial packaging and other purposes, and more particularly to a novel improved electrical tape-length selector or control mechanism for electrical tape dispensing machines enabling quick selection and dispensing of a wide range of tape increments.

2. Description of the Prior Art

There are many mechanical and electrical tape-dispensing machines for delivering predetermined length increments of tapes of various characteristics. The applicants jointly, and the applicant Hempel alone, have heretofore made many important contributions to the tape-dispensing art primarily directed to gummed tape moistened after length selection. Thousands of tape-dispensing machines have been made under applicant Hempel's patents and joint applicants' pending application by applicants' assignee. However, there has long existed the need for a substantially all electrical control for an electrical dispensing machine to eliminate the majority of moving parts, to provide even more accurate measurement than has been obtained, to facilitate the ease of operation and to otherwise improve upon existing structures.

SUMMARY OF THE INVENTION

In brief, the present novel improved tape-length selector or control mechanism for electrical tape-dispensing machines includes an electrically and mechanically integrated assembly comprising a head cover casting to which all units, subassemblies and parts are mounted. Tape increment selection pushbuttons are mounted on the casting in a circle. A novel 16-pole switch including 16 radial arms is disposed beneath the casting for actuation by the pushbuttons. A diode logic board or diode selective switching board is secured to the bottom of the casting and supports the said switch in operative relation with contacts on the board and with the pushbuttons. Supported from the casting beneath the diode logic board is a computer board assembly including a binary multistage counter, electrically connected with the diode logic board for conditioning of the former by the latter for counting. Beneath the computer board assembly and depending from the casting through a mounting plate are a measuring wheel rotatably engaged by dispensed tape, a permanent magnet mounted for rotation by said measuring wheel, and a reed-type pulse switch housed for closing twice by said magnet for each rotation of said measuring wheel, said pulse switch being operatively connected to said counter. Circuitry and elements are provided for energizing the electric motor of the basic tape dispensing machine. A transformer with rectifier provides low voltage direct current for the counter and diode logic board. An on-off and random operation switch is provided.

A main object of the present invention is to provide a novel tape-length selector or control mechanism package for electrical tape-dispensing machines which is a major improvement over applicants' prior controls and over other known units, and which fulfills the need which has existed in the art.

Other objects are to provide such improved novel control mechanism which is a further and major simplification of other controls known to applicants, which eliminates most moving parts heretofore employed in such controls including multiple switches and relays thereby improving on the continuous service of the unit and substantially eliminating downtime required for repairs, which simplifies maintenance on the job in providing unitary subunits which can be readily removed from and replaced in the control, which is a complete assembly adapted to permit ready removal from a tape dispensing machine for repair or replacement, which is adapted to give long untroubled service, which is accurate in tape measurement, which incorporates a novel 16-pole switch unit that is equivalent to 16 six-pole switches, which includes circularly disposed selection buttons in position for ready scanning by an operator, which incorporates a single-pulse electrical action eliminating multisegment dispensing or a continuous segment upon holddown of a selection button, which incorporates flexibility in the selection system whereby selections in multiples of 2 inches up to a maximum of 64 inches can be employed, which includes a circular progressive tape increment selection system for the operator of the machine enabling quick reference and accurate selection thereby saving time in packaging, which can be switched to random tape-length selection, and which otherwise fulfills the objects and advantages sought therefor.

DESCRIPTION OF A PREFERRED EMBODIMENT

Figures 1, 2, 3, 4, 5, 12:
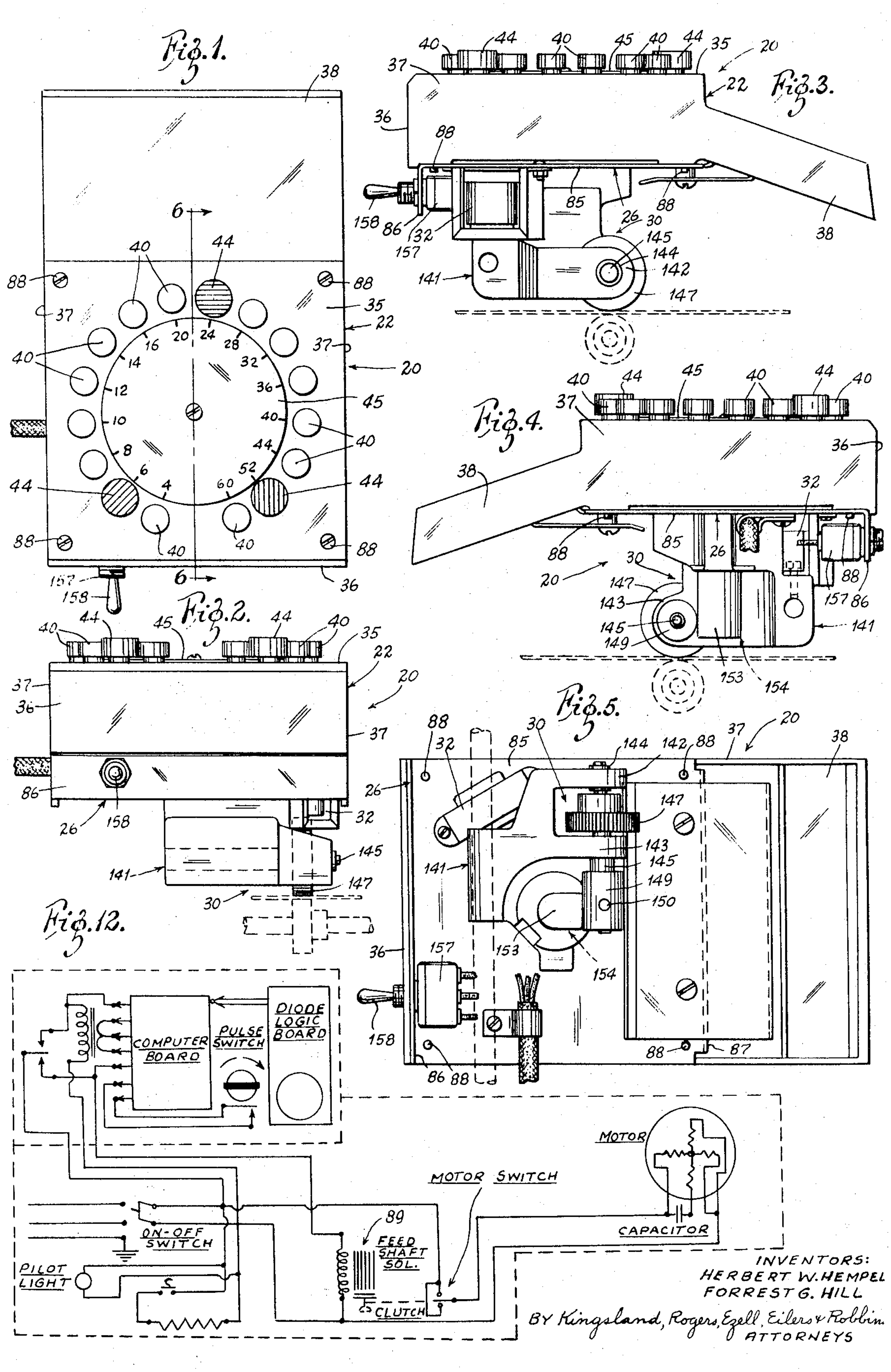
FIG. 1 is a top plan view of a tape-length selector or control mechanism for electrical tape-dispensing machines constructed to include the principles of the present invention.
FIG. 2 is an end elevational view thereof, looking upward in FIG. 1.
FIG. 3 is a side elevational view thereof, looking from right to left in FIG. 1.
FIG. 4 is a side elevational view thereof, looking from left to right in FIG. 1.
FIG. 5 is a bottom plan view thereof.
FIG. 12 is a condensed wiring diagram illustrating the electrical relationship of the present tape-length selector mechanism and a basic tape-dispensing machine.

Referring to the drawings more particularly by reference numerals, the present novel tape-length selector or control mechanism for electrical tape-dispensing machines is designated generally by the reference numeral 20. Broadly, the mechanism 20 includes a head cover casting 22, a diode logic board or diode selective switching board 24 mounted within the cover casting 22 adjacent the top wall thereof, a computer board assembly 28 beneath the diode logic board 24, a base plate 26 supporting the cover casting 22, the diode logic board 24, and the computer board assembly 28, a tape-measuring assembly 30 secured to and depending from the base plate 26, a power transformer 32, and interconnecting mechanical elements, circuitry, and other parts.

The cover casting 22 is of the configuration clearly shown in FIGS. 1—6 and includes a top wall 35, an end wall 36, sidewalls 37 and a rear tail portion 38. Mounted on the top wall 35 in a circular pattern are reciprocatable buttons 40, each of which has a stem 41 extending through a suitable opening in the top wall 35 which is maintained against withdrawal by a split washer 42 disposed in a groove in the stem 41 (FIG. 7). Sixteen buttons 40 are shown, but more or less can be employed within the capacity of a particular mechanism 20. Colored covers 44 on three buttons 40 are used for quick and repeat reference selection purposes. Secured to the top wall 35 within the circle defined by the buttons 40 is a dial 45 having tape increment numbers thereon in inches, which may be modified as required or desired.

Figures 6, 7, 8:
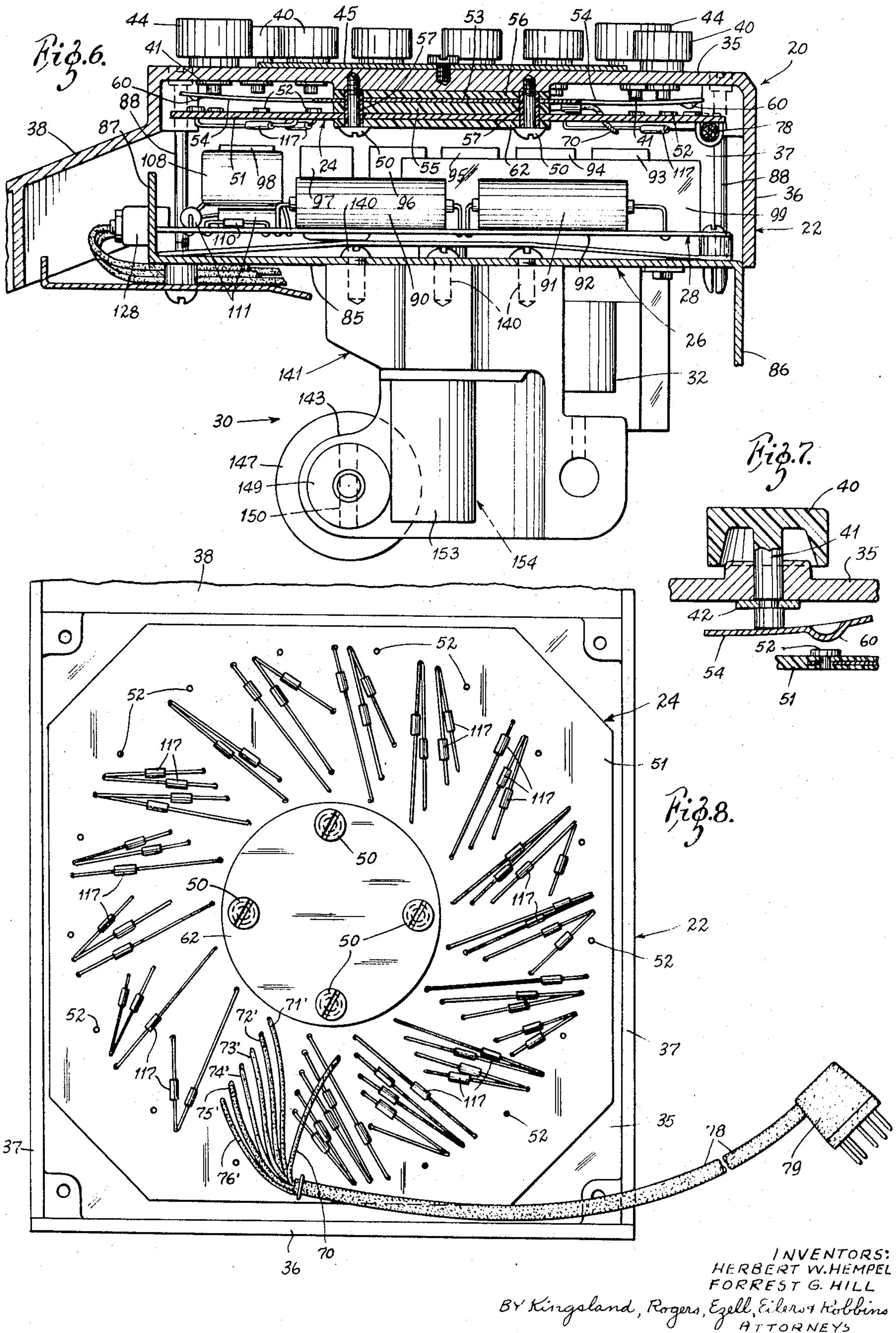
FIG. 6 is an enlarged cross-sectional view taken on substantially the line 6—6 of FIG. 1.
FIG. 7 is a further enlarged cross-sectional view through a pushbutton, switchplate finger portion and stationary contact.
FIG. 8 is an enlarged view of the bottom side of the diode logic board or diode selective switching board.
Figure 9:
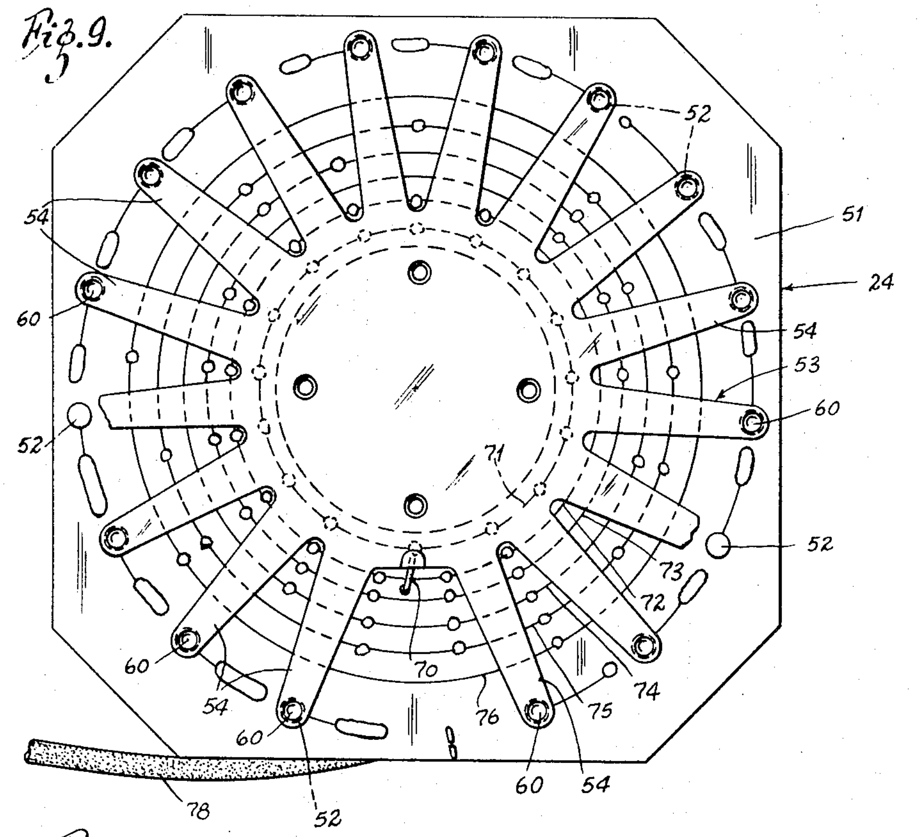
FIG. 9 is a view of the top side of the diode logic board illustrating the switch finger plate and printed circuits.
Figure 11:
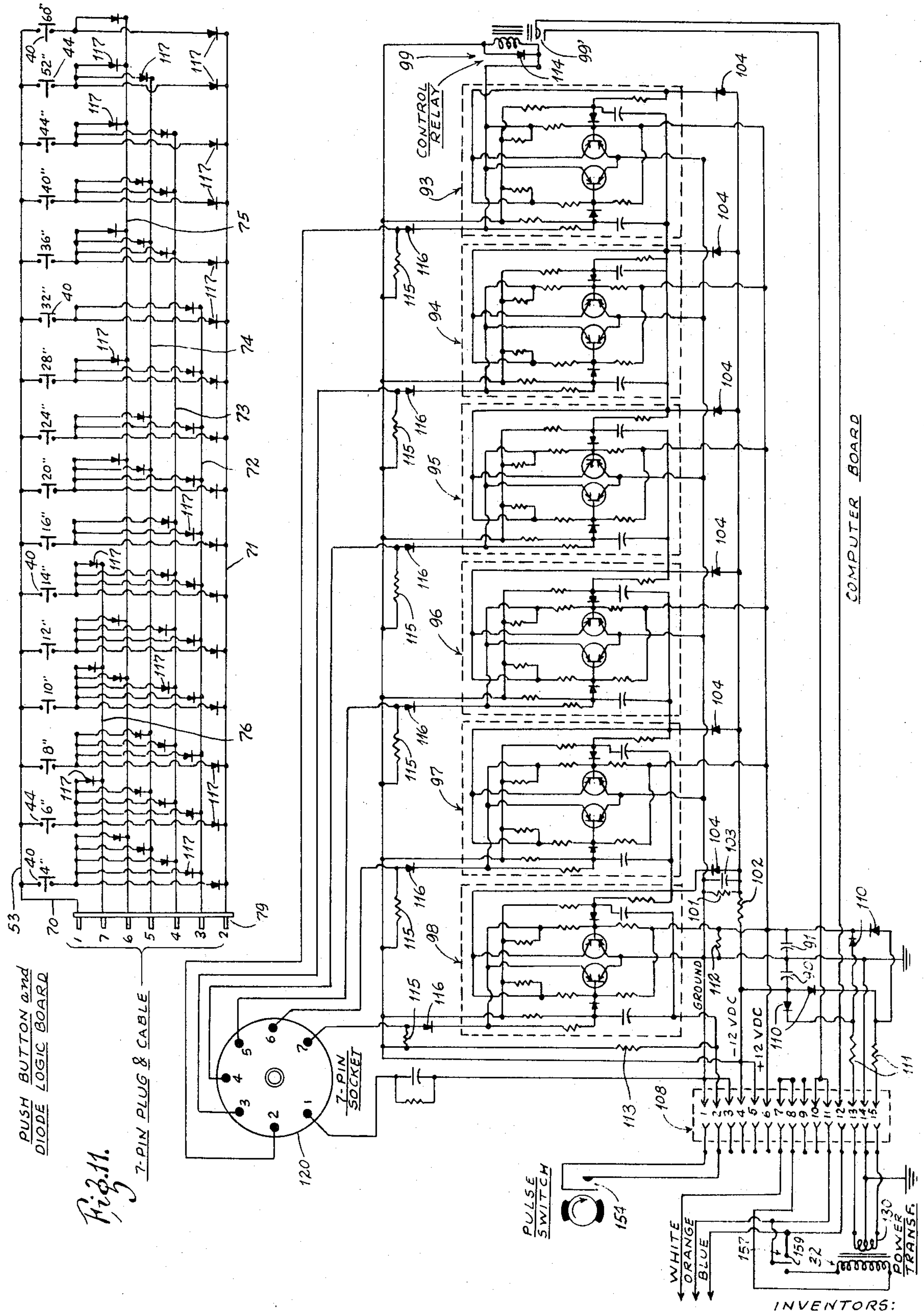
FIG. 11 is a wiring diagram illustrating in detail the circuitry of the present novel tape-length selector mechanism.

The diode logic board 24 is mounted against the bottom of the top wall 35 by means of spaced screws 50 (FIG 6). The board 24 includes a supporting plate 51 of suitable insulating material, here epoxy glass copper clad on the top for printed circuitry. On the top side of the plate 51 are 16 annularly spaced silver switch contacts 52 soldered to the copper, circuitry terminals, and printed circuitry (FIGS. 7 and 9). A switch plate 53 having 16 radial switch fingers 54 engageable with the 16 contacts 52 is mounted on the plate 51 being insulated therefrom by insulation discs 55 and insulated from the bottom of the top wall 35 by an insulation disc 56. Insulative bushings 57 surround the screws 50. Each finger 54 is formed to include near its outer end a depressed contact portion 60 adapted to engage its respective contact 52 upon being depressed by movement of the respective button 40, the fingers 54 being spring-biased into engagement with the ends of the stems 41 for maintaining the buttons 40 in raised position as shown in FIG. 7. Since each stem 41 engages its finger 54 radially inwardly of the contact portion 60, there is a wiping action between the contact portion 60 and its contact 52 as the respective button 40 is depressed and released, which contributes to clean contact areas. On the bottom of the plate 51 conveniently disposed in a circle about an insulation disc 62 are 16 groupings of switching diodes 117 which are electrically connected to printed buss bars 71, 72, 73, 74, 75 and 76 on the upper side of the plate 51 and to the switch plate 53, as is clearly shown in FIGS. 8, 9 and 11, to provide 16 circuits for conditioning a counter forming part of the computer board assembly 28 for measuring specified tape segments, such as the 16 lengths shown in FIG. 11, which is detailed below. Lead 70 connects the common switch plate 53 with pin No. 1 in the detail wiring diagram of FIG. 11. Leads 71′, 72′, 73′, 74′, 75′ and 76′ connect printed buss bars 71, 72, 73, 74, 75 and 76 with pins 2—7 (FIG. 11). The cable including the leads 71′-—76′ is indicated at 78 and the plug incorporating pins 1—7 is indicated at 79 in FIG. 8. The diodes 117 replace an equal number of single-pole switches, thereby effecting savings in cost and space and providing a superior functioning item for the intended purpose.

The base plate 26 includes a flat main portion 85, a front depending flange 86, and a rear upwardly extending flange 87 (FIG. 6). Elongated screws 88 maintain the cover casting 22 and base plate 26 together.

Figure 10:
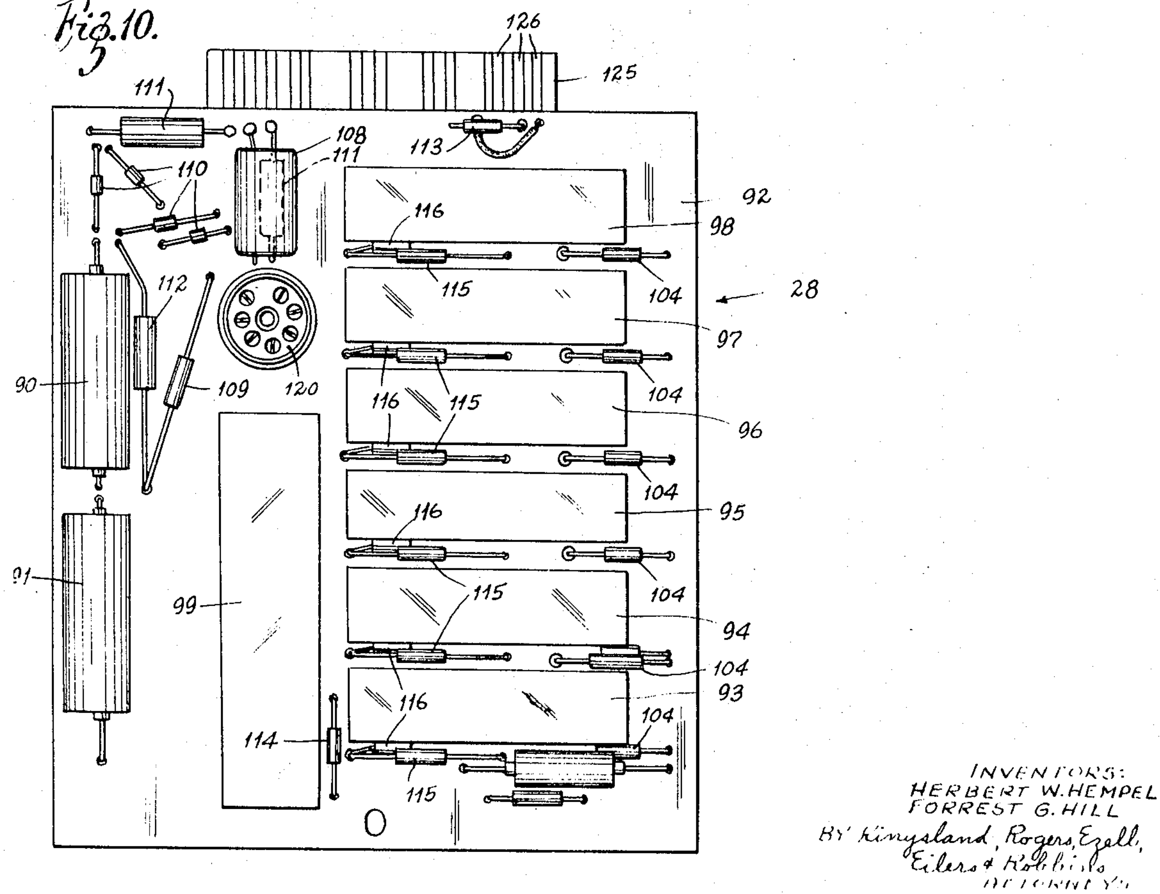
FIG. 10 is a view of the upper side of the computer board, the printed circuitry being omitted for clarity.

The computer board assembly 28 is mounted on the base plate 26 (FIGS. 6 and 10). The assembly 28 includes a plate 92 of suitable insulative material which is similar to the plate 51, except it includes printed circuitry on both sides. On its upper side, the plate 92 supports six bistable multivibrator circuit modules 93—98, which form a binary multistage counter. Each said module is a small compact composite unit or package comprising two transistors, ten resistors, two diodes and two capacitors electrically connected and insulated to form the bistable multivibrator or flip-flop module, each incorporating 13 leads which can be electrically connected and cascaded as required, such as disclosed herein, or, of course, for other purposes employing bistable circuits. Presently, applicants are using such modules made and sold by Electronics Engineering Company of California, Santa Ana, California. Manifestly, discrete components can be employed to achieve the same end results, though much greater bulk would obtain, and different integrated constructions can be employed.

The end module 93 is electrically connected to, for energization of, a control relay 99 having normally open contacts 99′ in an alternating current line voltage circuit which when closed energizes an operating solenoid 89 on the basic tape dispensing machine (FIGS. 11 and 12). The presently used relay 99 is of the reed type, 12 volt coil, 3 amp capacity. The modules 94—98 form the counting part of a five stage binary counter, the capacity of which is 32. Module 93 also deenergizes control relay 99 on signal of the module 94 when each count is complete to open the contacts 99′ and the circuit through the solenoid 98. Also in the relay circuit is a diode 114 mounted adjacent one end of the module 93, which protects the transistor of the module 93 from transient voltage from the coil of the relay 99 when said coil is deenergized.

Adjacent the relay 99 on the plate 92 are two 250 mfd. filter capacitors 90 and 91 for the DC power supply.

Forming part of a first resistor-capacitor pulse circuit which automatically clears or sets the binary counter to zero count when power is turned on to insure accurately measured tape segments are six reverse current blocking diodes 104, one of which is mounted adjacent each module 93—98 on the plate 92 and is electrically connected thereto (FIG. 11).

Also mounted on the plate 92 are a capacitor 108 (.22 mfd.) and a resistor 109 (100 K), which are included in a second resistor-capacitor pulse circuit that sets the six modules 93—98 of the binary counter, that is, through selection made by the diode logic board 24, it supplies the single electrical pulse for setting the proper modules in the binary counter so that the proper length of tape is eventually dispensed. It will be kept in mind that the present mechanism 20 operates on a one or single pulse action. Holding a button 40 closed, therefore, will dispense only one selected segment of tape. Also, in this second pulse circuit are six resistors 115 (22 K) and six diodes 116, one each being mounted adjacent each module 93—98 and electrically connected thereto (FIGS. 10, 11).

Clustered on the plate 92 are four power diodes or rectifiers 110 for providing the low voltage direct current power supply which are in circuit with the secondary of the transformer 32. Adjacent the diodes 110 are two current limiting resistors 111 (39 ohms) of the direct current power supply and a shunt voltage regulator resistor 112 (330 ohms) to maintain the secondary circuitry at 12 volts (FIG. 11).

A resistor 113 (4.7 K ohms) is mounted adjacent the module 98, which is in the input circuit thereof to hold the input at 12 volts. This resistor 113 is referred to below.

An electrical socket 120 including seven openings to receive the seven pins of plug 79 is mounted on the plate 92 and is electrically connected with printed circuitry formed on the bottom of the computer board assembly 28, detailed as to circuits in FIG. 11.

The bottom side of the plate 92 includes solder terminals and printed circuitry for the above elements mounted on the upper side thereof, clearly illustrated in the detailed wiring diagram of FIG. 11.

At one end of the plate 92 is a reduced extension 125 including printed terminals 126 which are received by a printed circuit board connector 128 mounted in an elongated slot in the flange 87 of the base plate 26 (FIG. 6). The present connector 128 includes 15 terminals, numbered 1—15 in FIG. 11. Succinctly, and with reference to FIG. 11 terminals 13, 14 and 15 connect the low voltage secondary 130 of the transformer 32 to the low voltage power circuitry of the mechanism 20. Terminals 11 and 12 connect the circuit of the control relay 99 to the solenoid 89 of the basic tape machine. Terminals 7 and 8 are connected to the primary of the transformer 32. Terminals 1 and 2 connect the count pulse switch 154 referred to below to the first module 98 of the binary counter. Terminals 3—6, 9 and 10 are not used.

The tape measuring assembly 30 is mounted on the bottom of the base plate 26 in depending position by screws 140 threadedly engaging a main casting 141 which is of the configuration shown in FIGS. 2—6. The casting 141 includes spaced bearing arms 142 and 143, each supporting a bushing 144 freely rotatable supporting a shaft 145. A measuring wheel 147 is secured to the shaft 145 between the arms 142 and 143. For convenience in counting, the circumference of the wheel 147 is 4 inches. An annular magnet housing 149 is secured to a free end of the shaft 145 outwardly of the arm 143, as is clear from FIG. 5, and supports a permanent magnet 150 extending diametrically therethrough and maintained in secure position by an allen screw extending axially into the housing 149. Supported from the casting 141 in position adjacent the magnet 150 is a pulse switch housing 153 having a conventional reed-type pulse switch 154 encased therein, as by potting, for actuation to closed position by the magnet 150. The pulse switch 154 is connected by suitable leads extending through an opening in the base plate 26 to terminals 1 and 2 of the connector 128 forming part of the circuitry including the resistor 113 the module 98, and ground, as is specifically shown in the detailed wiring diagram of FIG. 11. Thus, a 12 volt electric pulse is received by module 98 each time the switch 154 is closed on actuation by the magnet 150, which grounds the circuit momentarily.

It will be understood that the pulse for actuating the counter can be provided by other means than as disclosed. Transistor amplified magnetic pulsing or photoelectric pulsing, for example, may be used.

An on-off and random operation switch 157 is mounted on the depending flange 86 which includes an operating finger 158 (FIGS. 3, 5 and 11). The finger 158 has on and off positions, the control 20 being on automatic operation when the finger 158 is in on position. The finger 158 may be moved to a random position for continuous dispensing until released, being spring biased to off position. The aforesaid relationship is clear from FIG. 11 in which the random terminal is designated 159.

OPERATION

With the main on-off switch of the electric tape dispensing machine turned on, upon moving the finger 158 of the random switch 157 to on position, energy is supplied to the transformer 32 and diodes 110, making low voltage direct current available in the control 20. The modules 93—98 are biased to zero binary count in the off position or condition. The relay 99 connected to, for operation by, the module 93 is open with alternating line current supply available at its open contacts 99' to start the tape dispensing machine upon the relay 99 receiving a signal from the module 93. Direct current pulsing voltage is available at the normally open pulsing switch 154 and terminals 1 and 2 of the printed circuit board connector 128.

When any one of the selector buttons 40 is depressed, contact is made from the common switch plate 53 to the common diode terminal for that button 40 (FIG. 11). The .22 mfd. capacitor 108 charges and provides the electrical pulse through the diodes 117. Each of the selection switches closed by buttons 40 is connected through a diode 117 to the buss bar 71 to turn the relay control module 93 on and to energize the relay 99. This same pushbutton switching operation also simultaneously sets the selected count in modules 94—98 through diodes 117 connected to the contact of the specific actuated button 40.

Upon closing of the relay contacts 99', the motor of the tape-dispensing machine and tape feed wheel shaft clutch operate and feed tape causing rotation of the magnet 150 which operates the pulse switch 154. Tape-feeding action continues until the programmed count reaches the relay module 93 which deenergizes the relay 99. This completes the cycle with all modules 93—98 in the off position and the control 20 ready for the next selection. It will be noted that this conditioning of modules 94—98 through the selected grouping of diodes 117 in effect counts up to 32 minus the indicated tape length of the button 40 pushed divided by two, in view of the selected wiring of the binary counter, as clearly appears in FIG. 11. This permits the advantageous use of the single control relay 99 and its energization by the module 93. In other words, inverse counting is employed. Thus, in dispensing six inches of tape, the diodes 117 of the circuitry including the button 40 for six inches "falsely" substantially instantly condition the binary counter as though the pulse switch 154 had closed 29 times so that one and a half rotations of the measuring wheel 147 and three closings of the pulse switch 154 by the magnet 150 completes the count to 32. Thereupon, the module 93 is actuated to deenergize the relay 99.

The tape dispensing machines with which the present control 20 is employed feed 36 inches of tape per second.

It is apparent that there has been provided a novel tape length selector or control mechanism for electrical tape-dispensing machines which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

We claim:

1. Control mechanism for electrical tape-dispensing machines comprising a rotatably mounted tape-measuring wheel, means for rotating said tape-measuring wheel, means for electrically counting preselected numbers of rotational increments of said tape-measuring wheel, means for actuating said rotating means and substantially simultaneously energizing said electrical counting means to count rotational increments, and means for stopping said rotating means and substantially simultaneously deenergizing said electrical counting means.

2. The combination of claim 1 in which said electrical counting means includes a binary multistage counter and means for pulsing said counter.

3. The combination of claim 2 in which said pulsing means includes a pulse switch and a permanent magnet, said permanent magnet being mounted for movement in direct relation with the rotation of said measuring wheel for repeatedly momentarily closing said pulse switch on a predetermined basis of tape increment feed, said pulse switch being electrically connected to said counter.

4. The combination of claim 2 and including means for conditioning said counter for making a preselected number of counts.

5. The combination of claim 4 and including means for clearing said counter to zero binary count in the off condition of the counter and the on condition of said control mechanism.

6. The combination of claim 4 in which said counter-conditioning means includes a plurality of groups of switching diodes, one for each selectable tape increment.

7. The combination of claim 6 and including tape increment selector pushbuttons, and a multipole switch including a common conductive base and a plurality of switchblades and engageable contacts, there being a switchblade and contact for closing by each pushbutton, each contact being electrically connected with one group of said groups of switching diodes.

8. The combination of claim 7 in which said means for actuating said rotating means includes a relay effective upon energization to close the motor circuit of an associated electrical tape-dispensing machine and to open such circuit upon being deenergized.

9. The combination of claim 1; in which said actuating and energizing means includes a multipole switch including a common base and a switchblade and contact for each selectable increment of tape, and means for selectively closing each switchblade with its associated contact.

10. The combination of claim 9 in which said closing means includes a pushbutton for each switchblade.

11. Control mechanism for electrical tape-dispensing machines comprising means for energizing the tape-feeding motor circuit of an electrical tape-dispensing machine including switch-closing means, rotary tape-measuring means engageable by fed tape to rotate said rotary tape-measuring means, and means for counting preselected rotative increments of said rotary tape-measuring means including a binary multistage counter, means for conditioning the counter to count a selected number of rotative increments of said rotary tape-measuring means to measure a predetermined length of tape, means for pulsing said counter, and means for deenergizing the tape-feeding motor circuit upon completion by said counter of its selected count.

12. The combination of claim 11 in which said pulsing means includes a normally open pulsing switch electrically connected to said counter and magnetic means for closing said switch each time a predetermined increment of tape is fed past a predetermined point.